(12) United States Patent
Thornton et al.

(10) Patent No.: US 7,307,816 B1
(45) Date of Patent: Dec. 11, 2007

(54) FLEXURE DESIGN AND ASSEMBLY PROCESS FOR ATTACHMENT OF SLIDER USING SOLDER AND LASER REFLOW

(75) Inventors: Brian Scott Thornton, Santa Clara, CA (US); Edmund Bruno Fanslau, Jr., San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 557 days.

(21) Appl. No.: 10/026,152

(22) Filed: Dec. 21, 2001

(51) Int. Cl.
*G11B 5/48* (2006.01)
(52) U.S. Cl. .................................. 360/234.6
(58) Field of Classification Search ............. 360/234.6, 360/245.3
See application file for complete search history.

(56) References Cited

U.S. PATENT DOCUMENTS

| | | | |
|---|---|---|---|
| 4,761,699 A | 8/1988 | Ainslie et al. | 360/234.5 |
| 4,789,914 A | 12/1988 | Ainslie et al. | 360/234.5 |
| 5,126,901 A | 6/1992 | Momoi et al. | 360/234.5 |
| 5,177,860 A | 1/1993 | Yura et al. | |
| 5,327,310 A | 7/1994 | Bischoff et al. | |
| 5,530,604 A | 6/1996 | Pattanaik | 360/234.5 |
| 5,680,275 A | 10/1997 | Frater et al. | 360/234.5 |
| 5,699,212 A | 12/1997 | Erpelding et al. | 360/245.8 |
| 5,734,524 A | 3/1998 | Ruiz | |
| 5,737,837 A | 4/1998 | Inaba | 29/884 |
| 5,781,379 A * | 7/1998 | Erpelding et al. | 360/245.3 |
| 5,815,347 A | 9/1998 | Pattanaik | 360/234.5 |
| 5,821,494 A * | 10/1998 | Albrecht et al. | 219/121.64 |
| 5,828,031 A | 10/1998 | Pattanaik | 219/121.63 |
| 5,889,636 A | 3/1999 | Arya et al. | 360/234.5 |
| 5,896,248 A | 4/1999 | Hanrahan et al. | 360/234.5 |
| 6,002,550 A | 12/1999 | Amemiya et al. | 360/234.5 |
| 6,046,882 A * | 4/2000 | Pattanaik et al. | 29/878 |
| 6,098,271 A | 8/2000 | Yamamoto et al. | 29/603.06 |
| 6,188,546 B1 * | 2/2001 | Nakajima et al. | 360/234.5 |
| 6,198,599 B1 | 3/2001 | Senuma | 360/234.5 |

(Continued)

FOREIGN PATENT DOCUMENTS

JP 54062949 A 5/1979

OTHER PUBLICATIONS

Masashi Shiraishi, "Chip on Suspension MR Head", IEMT/IMC Symposium, 2nd 1998, Apr. 15-17, 1998, pp. 333-336.

*Primary Examiner*—David Davis

(57) ABSTRACT

A slider/suspension design and assembly method include securing a slider to a suspension assembly for use in a magnetic disk drive data recording device. To this end, solder bumps are applied to a metalized backside surface of the slider, and are patterned and flown within a plurality of receptacles to form a rigid mechanical connection between the slider to the flexure, while also enabling the slider-suspension assembly to be separated without damage during the process. The slider/suspension assembly is initiated by forming a plurality of slider bars on a wafer, in such a manner that the trailing edge surfaces of the sliders form a front side of the wafer. A plurality of thin film read/write elements and a plurality of electrical contact pads are formed on the wafer front side. Slider bars are then diced from the wafer, and the slider backsides are metalized on the slider bars. A pattern of solder bumps is applied onto the metalized backsides of the slider bars, and the slider bars are then sliced to form individual sliders that are secured to corresponding flexures.

10 Claims, 13 Drawing Sheets

U.S. PATENT DOCUMENTS 6,351,353 B1 * 2/2002 Sluzewski et al. ....... 360/294.3
6,523,250 B2 * 2/2003 Erpelding et al. ....... 29/603.04

6,539,609 B2    4/2003 Palmer et al.

* cited by examiner

FLEXURE DESIGN AND ASSEMBLY PROCESS FOR ATTACHMENT OF SLIDER USING SOLDER AND LASER REFLOW

CROSS-REFERENCE TO RELATED APPLICATION

This application is related to co-pending U.S. patent application Ser. No. 10/026,327, titled "Flexure Design And Assembly Process For Slider Leading Edge Solder Fillet Bond," which is filed currently herewith, and which is assigned to the same assignee as the present application.

FIELD OF THE INVENTION

The present invention relates in general to data storage systems such as disk drives, and it particularly relates to a slider and a flexure to which the slider is attached. More specifically, the present invention provides a novel flexure design and assembly process for securing the slider to the flexure by means of solder bumps applied to the metalized slider surface.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

The suspension assembly includes a resilient load beam, and a flexure to which the slider with a magnetic read/write head is attached. The load beam generally directs the slider toward the air bearing surface (ABS) at a predetermined angle. The aerodynamic force generated by the ABS is reacted by the load beam to maintain the slider over the surface of the spinning magnetic disk at a predetermined flying height.

In a conventional magnetic disk drive, the slider is attached to the flexure by means of an adhesive connection at its interface surface with the flexure. A conventional method of attaching the slider to the suspension that is in common use in the industry typically involves creating a permanent adhesive bond between the slider and the suspension. The method of using an epoxy bonding technique is illustrated in FIG. 6.

A disadvantage of the epoxy bonding method emanates from the permanence of the bond in that any attempt to separate the slider from the suspension would typically necessitate breaking the bond and thus inducing a potential irreversible damage to the suspension-flexure assembly.

Various attempts have been made to alleviate the foregoing concern. Slider-suspension assembly technologies such as solder bumping, under-bump metallization, and flip chip are known in the industry for providing solder bonding process in lieu of epoxy bonding.

One such attempt is exemplified by U.S. Pat. No. 4,761,599 to Ainslie et al. that describes a slider-suspension assembly suitable for mechanically and electrically joining the two components using solder bonding. The bonding method uses simultaneous reflow of all solder bumps, which might necessitate global heating of the entire assembly, including the thin film read/write head.

While conventional methods may have addressed and resolved certain aspects of the foregoing concern, they are not completely satisfactory in that the use of discrete solder contact pads requires masking process steps in manufacturing of slider. In addition, global heating to reflow typical solder alloys could require temperature exposure that is incompatible with the temperature limitation of the read/write head. The need for a comprehensive solution has heretofore remained unsatisfied.

SUMMARY OF THE INVENTION

The present invention can be regarded as a method of manufacturing a head gimbal assembly for use in a data storage system. A slider is fabricated to have an air bearing surface and a backside that opposes the air bearing surface. A plurality of solder bumps is deposited on the backside. The slider is positioned to be adjacent to a flexure having at least a thermally conductive flexure tongue coated with an insulation layer, and a pattern of receptacles that extend through the insulation layer to the flexure tongue, such that the solder bumps are substantially aligned with the receptacles. A laser beam is directed to the flexure tongue to heat the flexure tongue sufficiently to melt the solder bumps.

The use of this and other features of the present invention, in conjunction with a thermally processed electrical connection, enables rework of a reject head on a good suspension.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
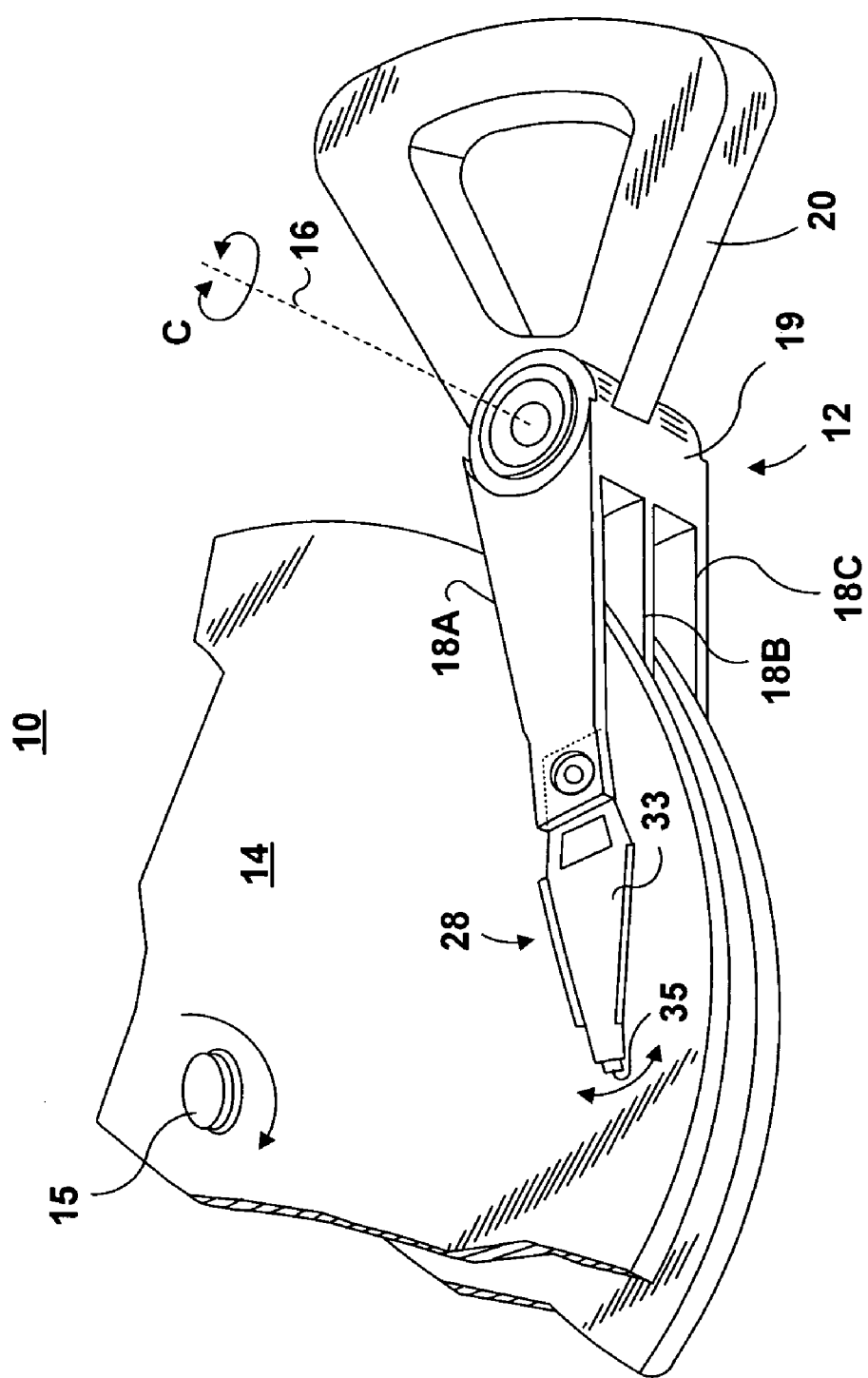
FIG. 1 is a fragmentary perspective view of a data storage system utilizing a read/write head of the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
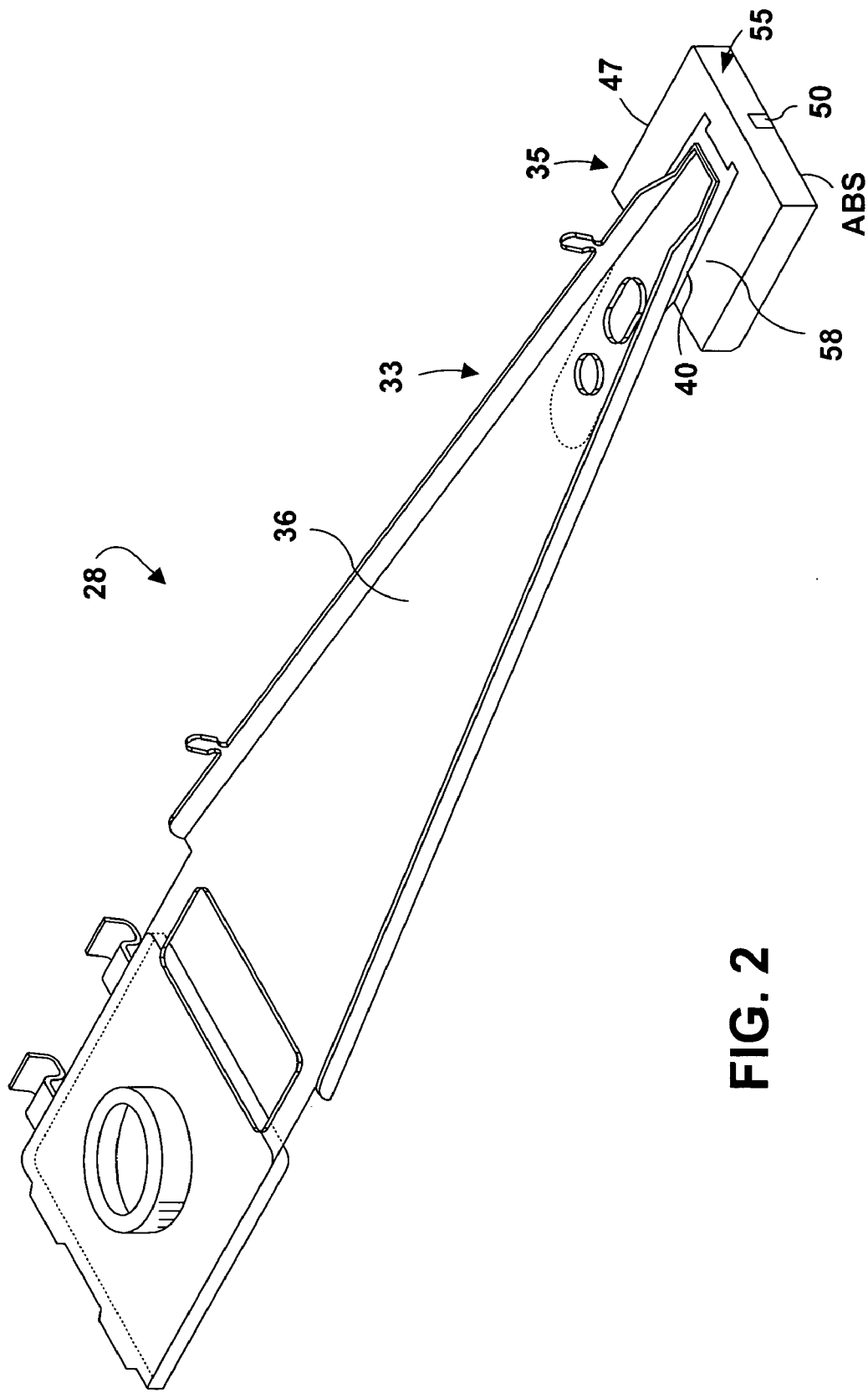
FIG. 2 is a perspective view of a head gimbal assembly (HGA) comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write transducer or head 35. The suspension 33 includes a resilient load beam 36 and a flexure 40 to which the head 35 is secured.

The head 35 is formed of a slider 47 secured to the free end of the load beam 36 by means of the flexure 40, and a read/write (or data transducing) element 50 supported by the slider 47. The slider 47 can be any conventional or available slider. The read/write element 50 is mounted at the trailing edge 55 of the slider 47 so that its forwardmost tip is generally flush with the ABS of the slider 47, which is parallel to the surface of the disks 14. The backside 58 of the slider 47, opposite to the ABS, is attached to a tongue 56 of the flexure 40, as illustrated in FIG. 3.

Figure 5:
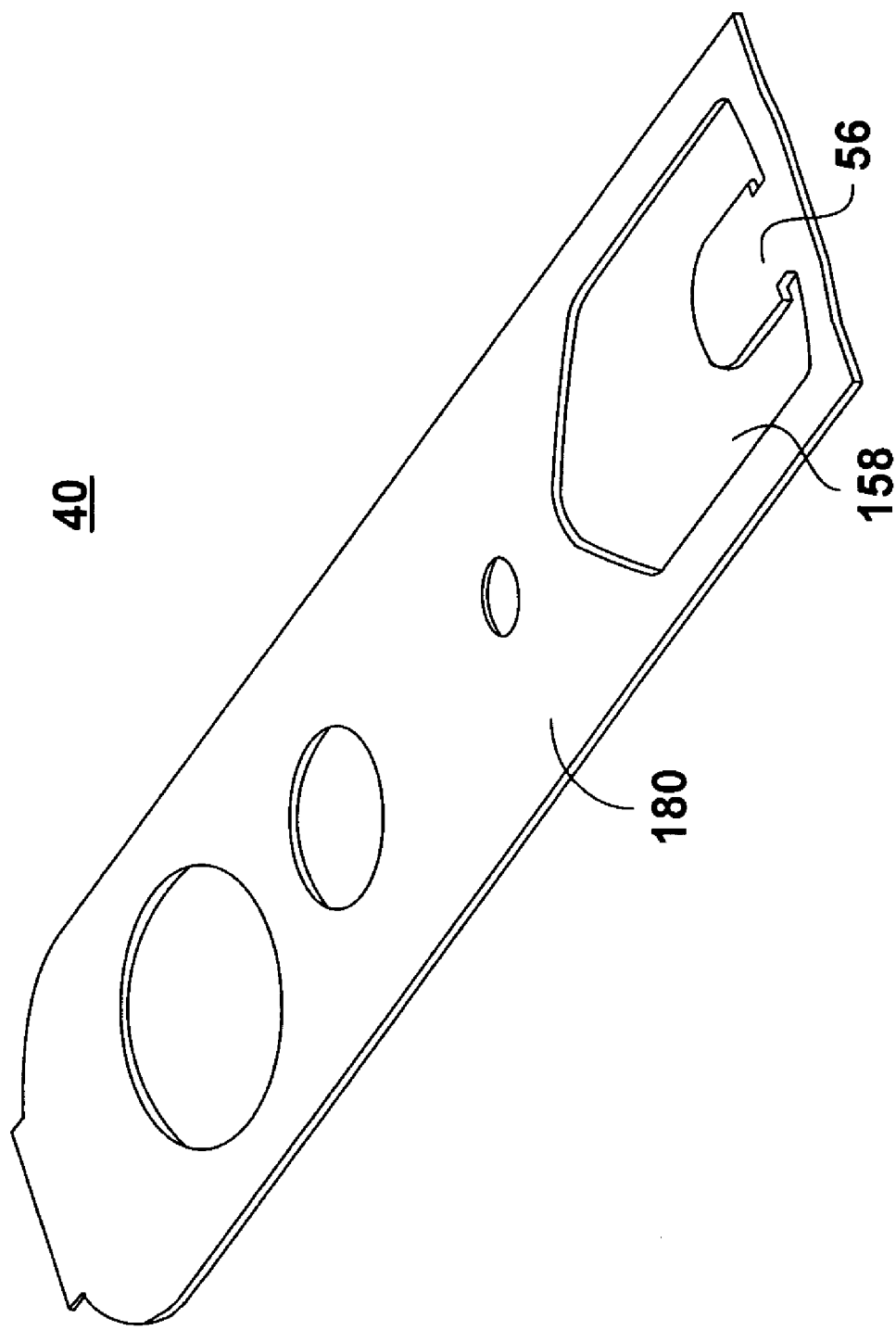
FIG. 5 is an isometric view of a flexure that forms part of the HGA of FIG. 2.

With reference to FIG. 5, the flexure 40 includes a tongue 56 that extends inwardly within a clearance 158 formed in a flexure body 180. As shown in FIG. 3, the flexure 40 provides the slider 47 with sufficient flexibility in various degrees of movement for accommodating the uneven topology of the disk (or data medium) surface and other components and drive assembly tolerances, while the slider 47 is flying over the disk. The flexure 40 is sufficiently stiff in a direction parallel to the disk plane, to resist physical deflection that may be caused by the rapid movement of the actuator arms 18A, 18B, 18C.

The slider 47 is part of the read-write head 35, and is secured to the tongue 56 by means of the technique described herein, which will be described in more detail in connection with FIGS. 8 through 13. A plurality of conductive contact pads 161 are secured to a trailing edge 55 of the slider 47, with only one contact pad 161 being shown in FIG. 3 for the purpose of illustration only. These contact pads 161 are electrically connected to a read/write element 50 by means of conductive traces.

Figure 3:
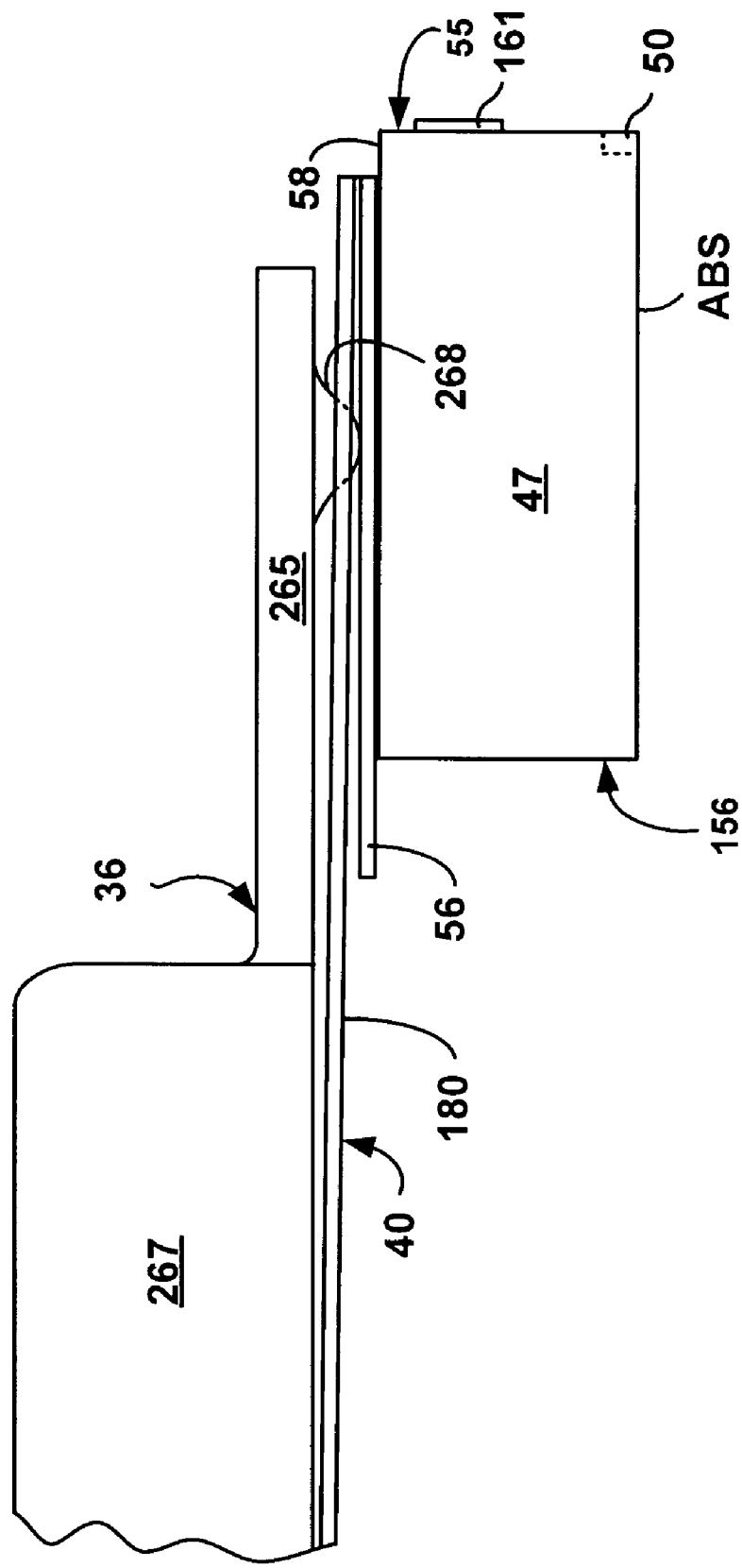
FIG. 3 is an enlarged, fragmentary, side elevational view of the HGA of FIG. 2.
Figure 4:
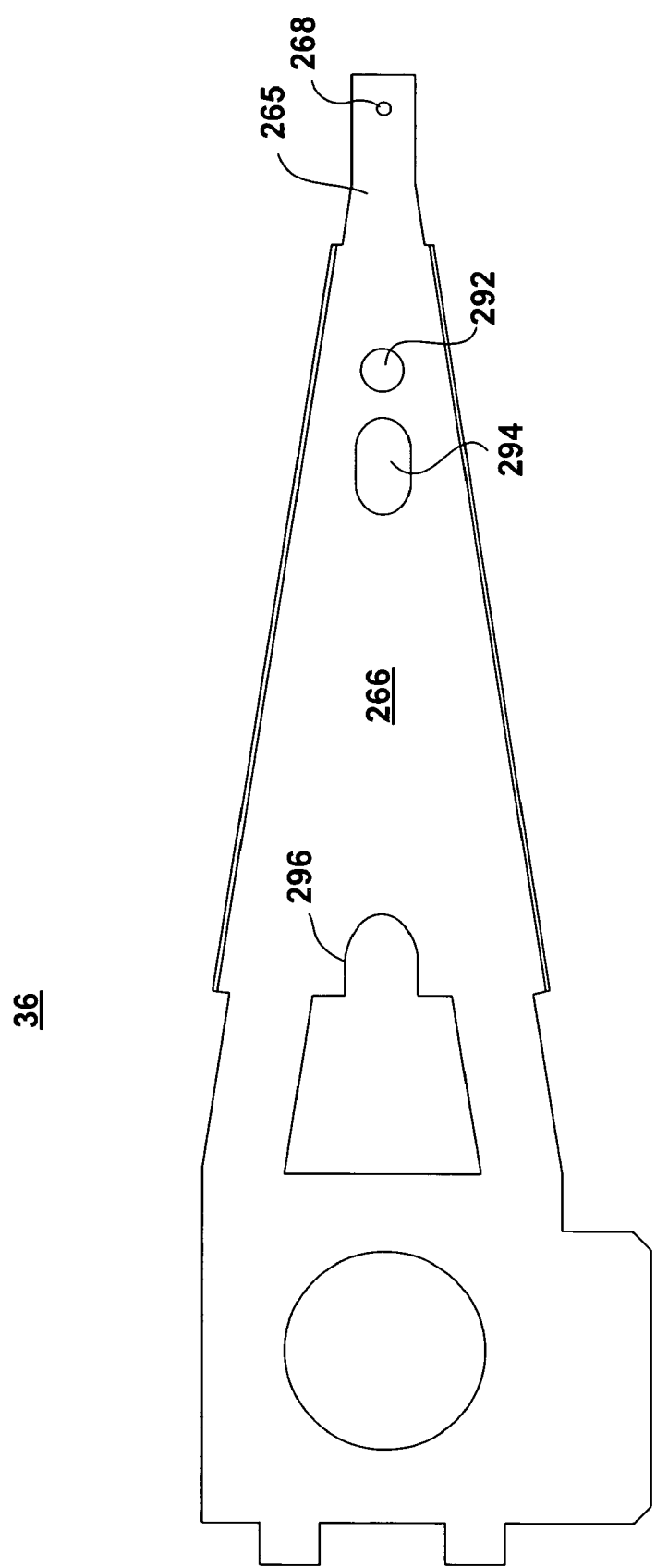
FIG. 4 is a top plan view of a load beam that forms part of the HGA of FIG. 2.

With reference to FIGS. 3 and 4, a dimple 268 is formed in the forward tip 265 the load beam 36, and is urged against the backside of the tongue 56, for contributing to the gimbaling action. Alternatively, the dimple 268 may be formed on the tongue 56, and urged against the underside of the load beam 36.

The load beam tip 265 is positioned above the flexure clearance 158 and at least part of the tongue 56. In one embodiment, the tip 265 extends integrally in a body 266 having two stiffening rails 267 projecting substantially along the length of the body 266. The body 266 includes datum features 292, 294, and 296 (FIG. 4).

Figure 6:
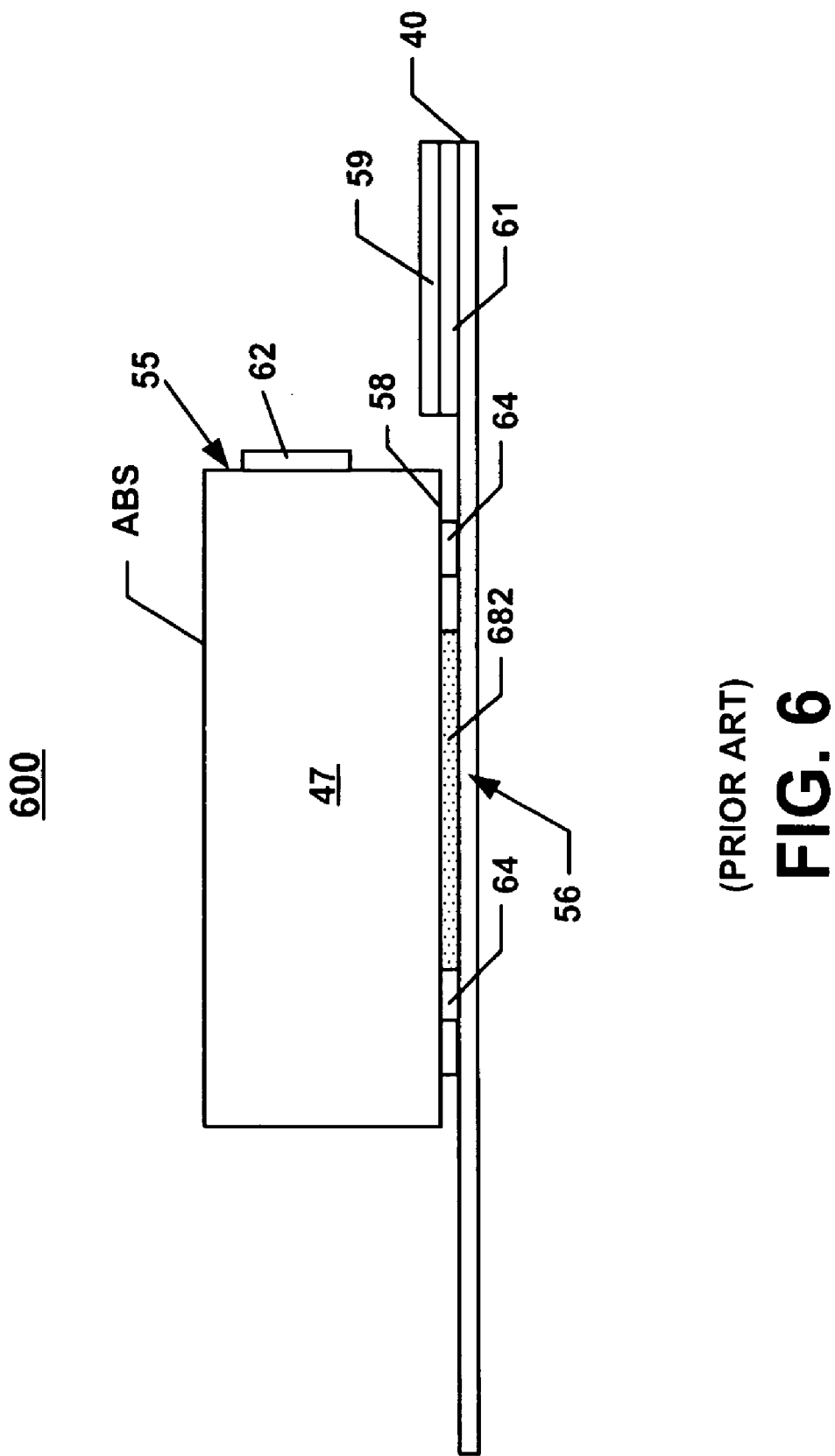
FIG. 6 is an enlarged, side view of a conventional slider/suspension assembly, illustrating the method of epoxy bonding for securing the slider to the suspension.

Referring now to FIG. 6, it illustrates a conventional slider/suspension assembly 600 that is assembled using a known epoxy adhesive bonding process. The backside 58 of the slider 47 is secured to the stainless flexure tongue 56 of the flexure 40 by a thin film of epoxy adhesive layer 682 that is deposited between the slider backside 58 and the flexure tongue 56. The thin film of adhesive layer 682 may be a combination of adhesives each contributing different characteristics to the connection such as mechanical strength or electrical conductivity.

A plurality of dielectric pads 64 are positioned forward and rearward of the slider 47 between the slider backside 58 and the flexure tongue 56. The dielectric pads 64 provide the electrical insulation for the slider 47 from making electrical contacts with the stainless steel flexure tongue 56.

Typically, the epoxy adhesive layer 682 is prepared with a hardener at room temperature. Upon applying the epoxy adhesive to the flexure tongue 56, a curing process at an elevated temperature is carried out by subjecting the slider/suspension assembly 600 to a thermal source, such as in a curing oven. The post-cure epoxy adhesive layer 682 reaches its optimal mechanical strength and provides a rigid mechanical connection of the slider 47 to the flexure 40. An electrical connection of the slider 47 to the flexure 40 is then made by means of an electrical trace that connects the terminal pad 62 mounted at the trailing edge 55 of the slider 47 to the copper trace layer 59, which rests upon a dielectric layer 61 in turn resting upon the stainless steel flexure tongue 56. Upon curing, the epoxy adhesive layer 682 then becomes permanent and irreversible. In the event that the read/write head 35 should fail any of the inspection criteria, the flexure 40 and possibly the suspension 33, together with the defective read/write head 35 would be discarded.

Figure 7:
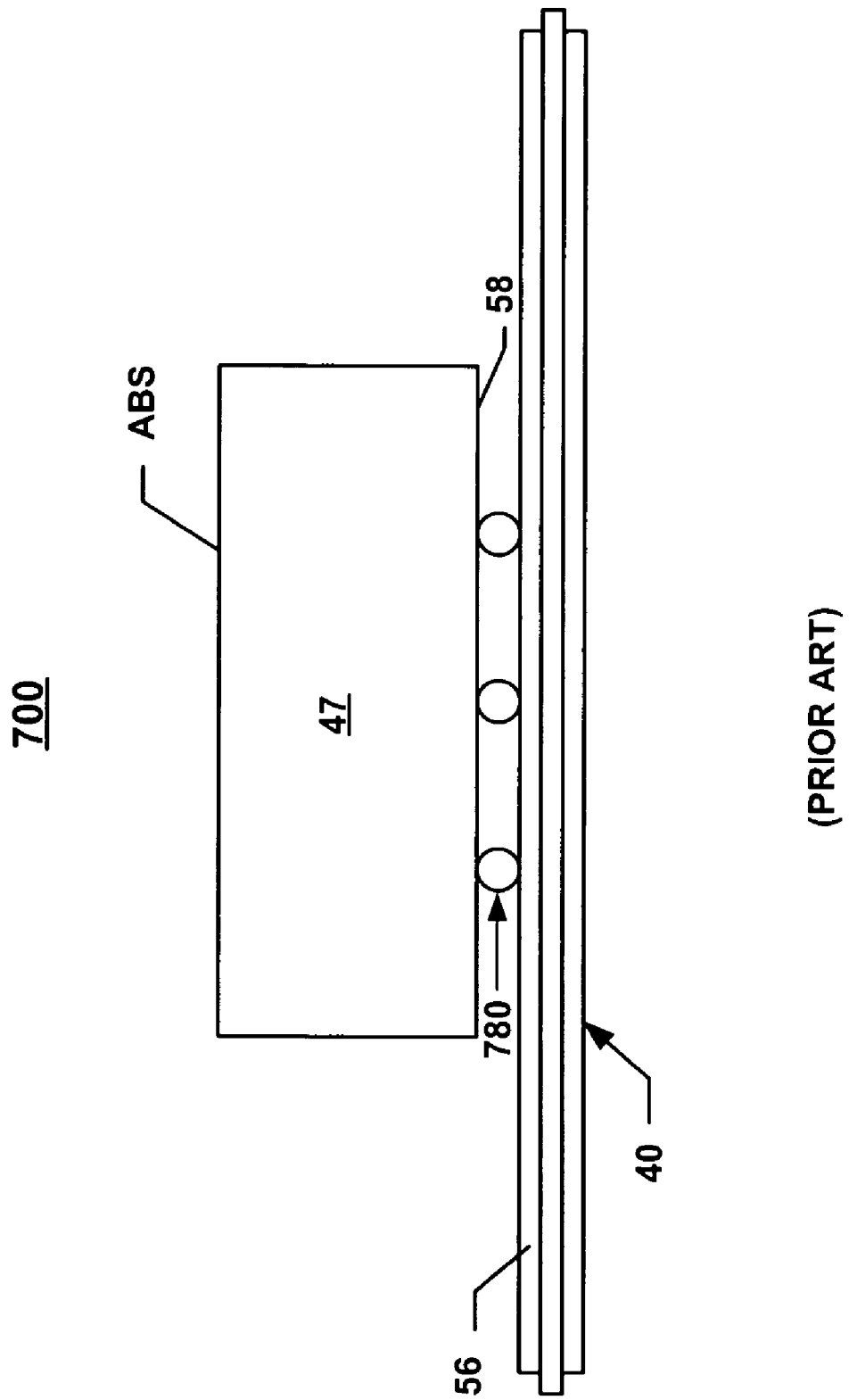
FIG. 7 is a side view of another conventional slider/suspension assembly, illustrating the method of solder bonding for securing the slider to the suspension.

FIG. 7 illustrates another conventional slider/suspension assembly 700 that utilizes a conventional solder bonding process. According to this process, a plurality of solder bumps 780 are placed directly between the backside 58 of the slider 47 and the flexure tongue 56. Upon heating, the solder bumps 780 reflow to wet the interface surface between the slider backside 58 and the tongue 56, thereby creating a solid mechanical connection between the slider 47 and the flexure 40.

During the reflow processing of the solder bumps 680, the slider/suspension assembly 700 is usually subjected to heating to an elevated temperature that might be incompatible with the thermal rating of the read/write element 50, thus potentially adversely affecting the performance of the read/write element 50 in an adverse manner. The use of solder bumps 680 on discrete solder pads usually requires an additional masking process in manufacturing the slider, which further increases the manufacturing complexity and cost.

Figure 8:
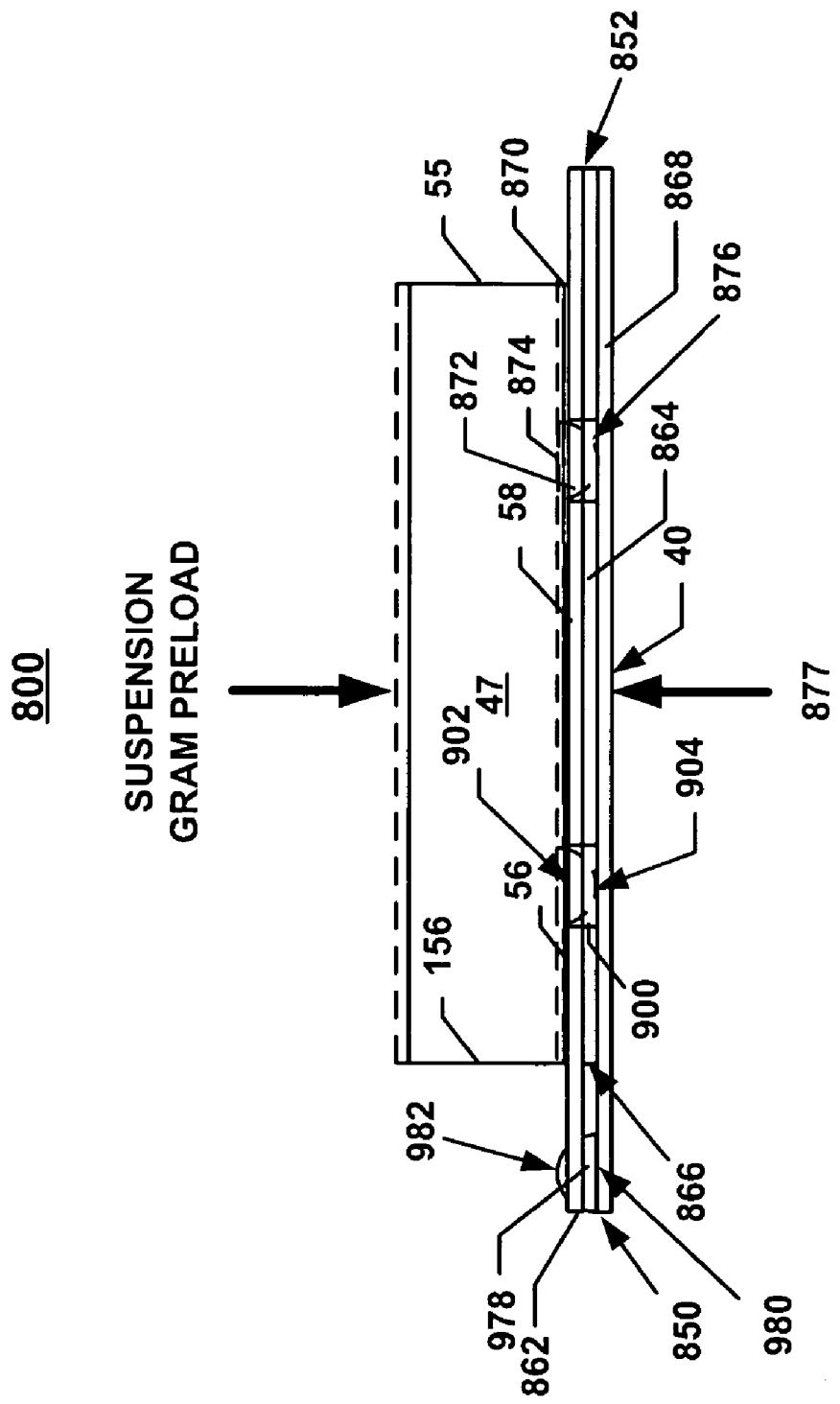
FIG. 8 is a side view of a preferred embodiment of the slider/suspension assembly, illustrating the solder reflow process according to the present invention.
Figure 9:
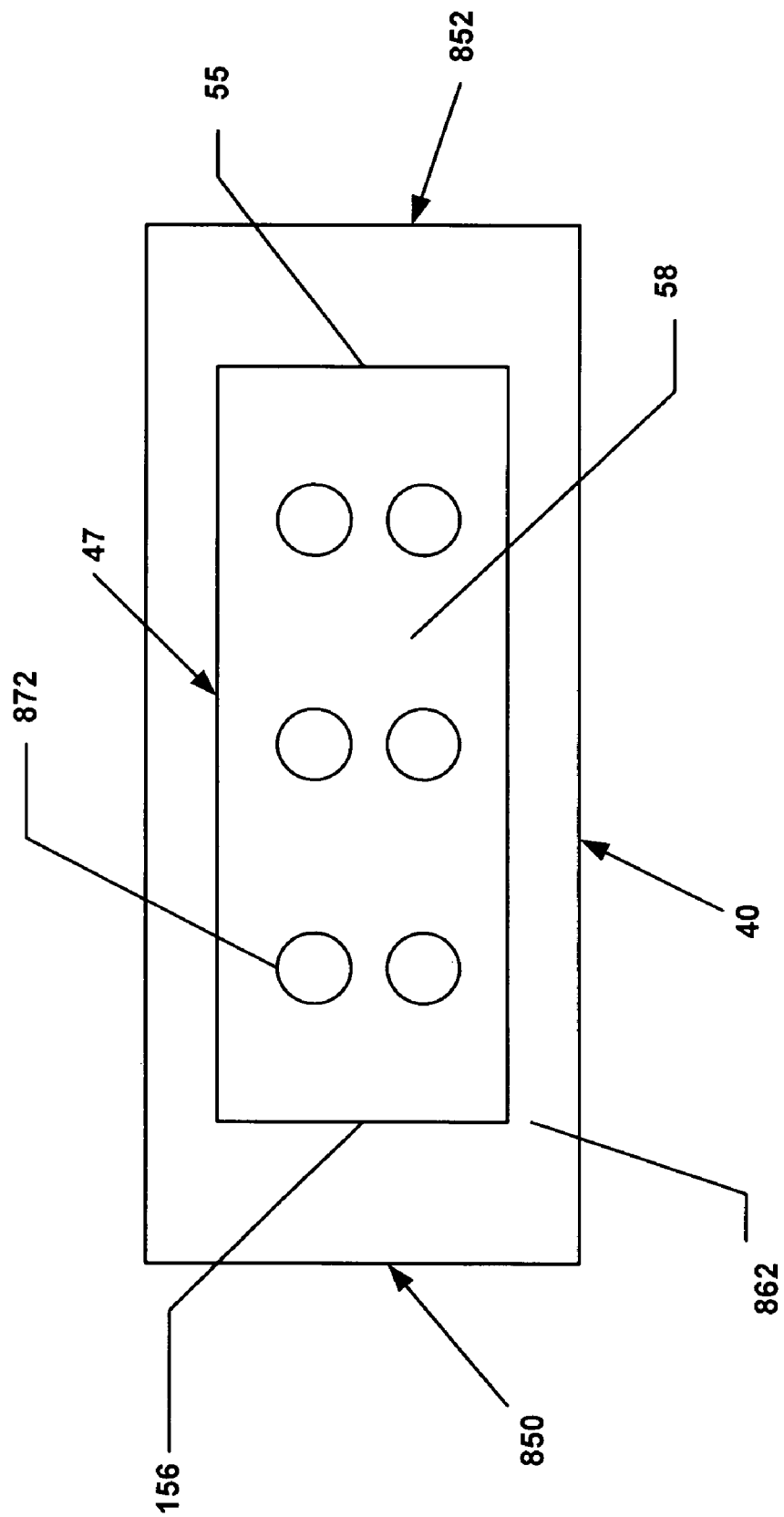
FIG. 9 is a bottom plan view of the slider shown secured to a flexure tongue, and illustrating a solder bump pattern.

FIGS. 8 and 9 illustrate a preferred embodiment of the slider/suspension assembly 800 made according to the present invention. The backside 58 of the slider 47 is positioned adjacent to the tongue 56 of the flexure 40.

In this exemplary embodiment, the flexure 40 is formed of a multi-layer (i.e., three-layer) material. The first layer is known as the metallic bond pad 862. The metallic bond pad 862 is made of a material that is compatible with a fluxless solder process, and also promotes adhesion of the solder material to the slider/suspension assembly 800.

An exemplary material of the metallic bond pad 862 is gold plated copper. In general, the metallic bond pad 862 could extend from the leading edge tip 850 to the trailing edge tip 852 of the flexure 40, which are located beyond the respective leading edge surface 156 and trailing edge surface 55 of the slider 47.

The second or intermediate layer of the flexure 40 is a polyimide insulator layer 864, which provides electrical insulation of the slider electrical connection. The leading edge 866 of the polyimide insulator layer 864 is recessed inward at a substantial distance relative to the leading edge tip 850 of the flexure 40 such that it is aligned with the leading edge surface 156 of the slider 47. The polyimide insulator surface 864 spans a distance from its leading edge 866 to the trailing edge tip 852 of the flexure 40. Alternatively, the leading edge 866 of the polyimide insulator layer 864 could be made to coincide with the leading edge tip 850 of the flexure 40 without substantially departing from the flexure design according to the present invention.

The third layer of the flexure 40 is a stainless steel flexure tongue 868 that provides the necessary resiliency to the slider/suspension assembly 800 to withstand the external aerodynamic forces induced in the ABS region. The stainless steel flexure tongue 868 generally extends from the leading edge tip 850 to the trailing edge tip 852 of the flexure 40, so that its length is approximately the same as the length of the metallic bond pad 862.

Still with reference to FIGS. 8 and 9, a plurality of solder bump receptacles 900 are also incorporated into the flexure 40. For the purpose of clarity, only two solder bump receptacles 900 are illustrated in FIG. 8. It should be understood that the preferred embodiment may include a different number of solder bump receptacles 900.

An exemplary solder bump receptacle 900 is generally formed by a cylindrical depression or cutout through the metallic bond pad 862 and the polyimide insulator layer 864. The radius 906 of the cylindrical surface of the solder bump receptacle 900 is approximately 75 microns such that its measure is greater than the depth 908 of the solder bump receptacle. The opening 902 of the solder bump receptacle 900 lies on top of the metallic bond pad 862, while the bottom 904 of the solder bump receptacle 900 lies on the surface of the stainless steel flexure tongue 868 adjacent to the polyimide insulator layer 864.

A plurality of solder bumps 872 are then placed into the solder bump receptacles 900. An exemplary solder bump 872 is generally of a hemispherical shape with a radius 876 of approximately 80 microns that is approximately the same as the radius 906 of the solder bump receptacles 900. The solder bumps 872 may be made of a conventional solder material such as a eutectic tin lead alloy.

The solder bumps 872 may be applied to the back side 58 of the slider 47 in a pattern as illustrated in FIG. 9. It should be understood that a different pattern could be used in accordance with the present invention. The pattern of the solder bump locations corresponds to the locations of the receptacles 900 on the flexure 40.

The solder bumps 872 are positioned within the solder bump receptacles 900 in a manner such that the flat surface 874 of the solder bumps 872 is protruded above the opening 902 and the convex surface 876 of the solder bumps 872 rests upon the bottom 904 of the solder bump receptacles 900. The flat surface 874 of the solder bumps 872 is generally parallel to the surface of the metallic bond pad 862. The protrusion of the solder bumps 872 above the metallic bond pad 862 is enabled by the geometric feature of the solder bump receptacles 900 in that its radius 906 is greater than its depth 908.

The distance of the protrusion of the solder bumps 872 above the metallic bond pad 862 is defined by the volume of the solder bumps 872, which in general must be greater than the volume of the solder bump receptacles 900 in order to form a bond line 870 between the back side 58 of the slider 47 and the metallic bond pad 862. The thickness of the solder bond line 870 can be controlled by adjusting either the volume of the solder bumps 872 or the volume of the solder bump receptacles 900 accordingly.

Increasing the volume of the solder bumps 872 would result in greater excess material to form a thicker bond line 870. Similarly, using a smaller volume of the solder bump receptacles 900 would accomplish the same objective as increasing the volume of the solder bumps 872. The ability of adjusting the bond line 870 thickness thus also provide a means to control the static attitude of the slider 47 after bonding.

With more specific reference to FIG. 8, the flexure 40 is pressed against the slider 47 by a suspension gram preload such that the backside 58 of the slider 47 is in direct physical contact with the flat surface 874 of the solder bumps 872 protruded above the metallic bond pad 862 of the flexure 40. The slider leading edge surface 156 is disposed at a recess from the leading edge tip 850 of the flexure 40.

In this embodiment, the slider leading edge is disposed at a recess from the leading edge tip 850 of the flexure 40. An extension of the metallic flexure layer used for the slider bond pad on the flexure is provided. Conductive adhesive is applied to the extension and underlying flexure stainless steel layer to create an electrical ground path between the slider body and the suspension flexure.

Laser (or heat) energy 877 is delivered to the outer surface of the stainless steel flexure tongue 868. The laser energy 877 heats the stainless steel flexure tongue 868 to the melting temperature of the material of the solder bumps 872, whereupon the solder bumps 872 become liquefied and reflow to wet the back side 58 of the slider 47 and the metallic bond pad 862.

As the solder bumps 872 become liquefied, the suspension gram preload continues to push the flexure 40 toward the back side 58 of the slider 47. The molten material of the solder bumps 872 fills the volume of the solder bump receptacles 900 in the metallic bond pad 862 and the polyimide insulator layer 864.

The excess material then is squeezed out of the solder bump receptacles 900 by the suspension gram preload to form a thin bond line 870 between the back side 58 of the slider 47 and the metallic bond pad 862. Upon cooling, the bond line 870 forms a solid mechanical and electrical connection between the back side 58 of the slider 47 and the metallic bond pad 862.

A slider is loaded into a fixture and clamped in place. Then a suspension is loaded into the same fixture such that the slider bond pads and receptacles align with the slider and solder bumps. While loading the suspension into the fixture, an arm is positioned to prevent contact between the suspension flexure and the slider. Once the suspension is clamped in place at the suspension baseplate, the arm is lowered so that the flexure tongue comes in contact with the slider and/or solder bumps thereby applying the gram preload to the slider.

In the design of the magnetic read/write head 35, careful consideration is given to the electrical grounding of the slider 47. This electrical grounding is necessary to prevent the buildup of static charges that could discharge to the surface of the data medium through the transducer poles from the transducer pole to the data medium. Such a discharge could result in the failure of the read/write head 35 and loss of data stored on the recording medium of the data medium.

To address this issue, reference the preferred embodiment of FIG. 8 incorporates a grounding path achieved by connecting the bond pad layer 862 of the flexure 40 to the stainless steel layer 868 of the flexure 40 with an electrically conductive adhesive 978. By applying a conductive adhesive between the copper grounding cap 978 and the stainless steel flexure 868, a grounding path between the slider 47 and the flexure 40 is established, thereby preventing harmful discharge of static electricity.

Figure 10:
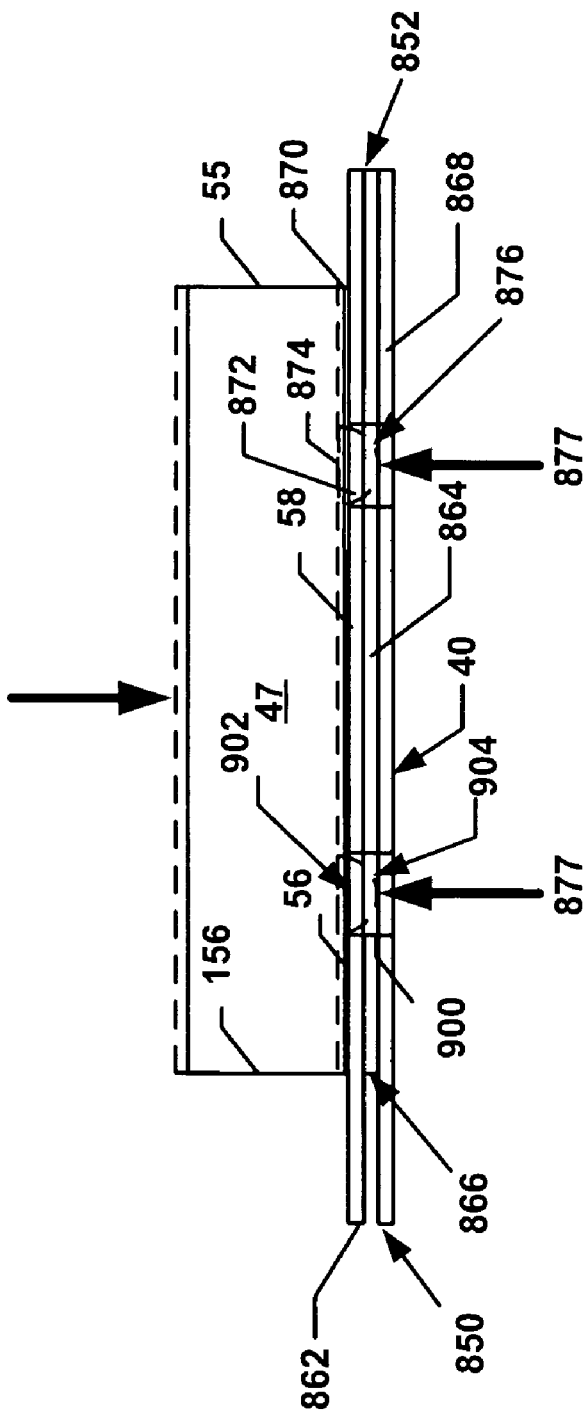
FIG. 10 is a side view of an alternate embodiment of the slider/suspension assembly, illustrating the solder reflow process according to the present invention.

FIG. 10 illustrates an alternative embodiment of the present invention. The solder bump receptacles 900 in the embodiment of FIGS. 8 and 9 are now replaced by solder bump cylindrical holes 920 through the metallic bond pad 862, the polyimide insulator layer 864, and the stainless steel flexure 868. Laser energy 877 is now delivered directly to the solder bumps 872 to enable more rapid heating and faster reflow of the solder material of the solder bumps 872. The copper ground cap 978 of the preferred embodiment of FIGS. 8 and 9 is omitted in the alternative embodiment of FIG. 10. The electrical ground path is now established through contact between the solder material of the solder bumps 872 and the stainless steel flexure 868.

The advantage of using solder bump bonding for attaching the slider 47 to the flexure 40 in accordance with the present invention is afforded by the ability to reflow the solder bond line 870. This allows for the removal of the read/write head 35 while the solder is molten, in the event that the read/write head 35 fails any of several inspection criteria. The suspension 33 can then be prepared to accept another head through the same or similar solder ball bonding process. A large portion of the suspension 33 cost is thus saved through the suspension recovery and reuse, hence providing a substantial economic advantage. Furthermore, the application of laser energy 877 to the stainless steel surface 868 ensures that the local heating would not adversely affect the thermal compatibility of the read/write element 50.

Another advantage of the present invention is the placement and simplicity since no patterning is required for the metallization process in the manufacturing flow which results in an improved manufacturing efficiency.

Figure 11:
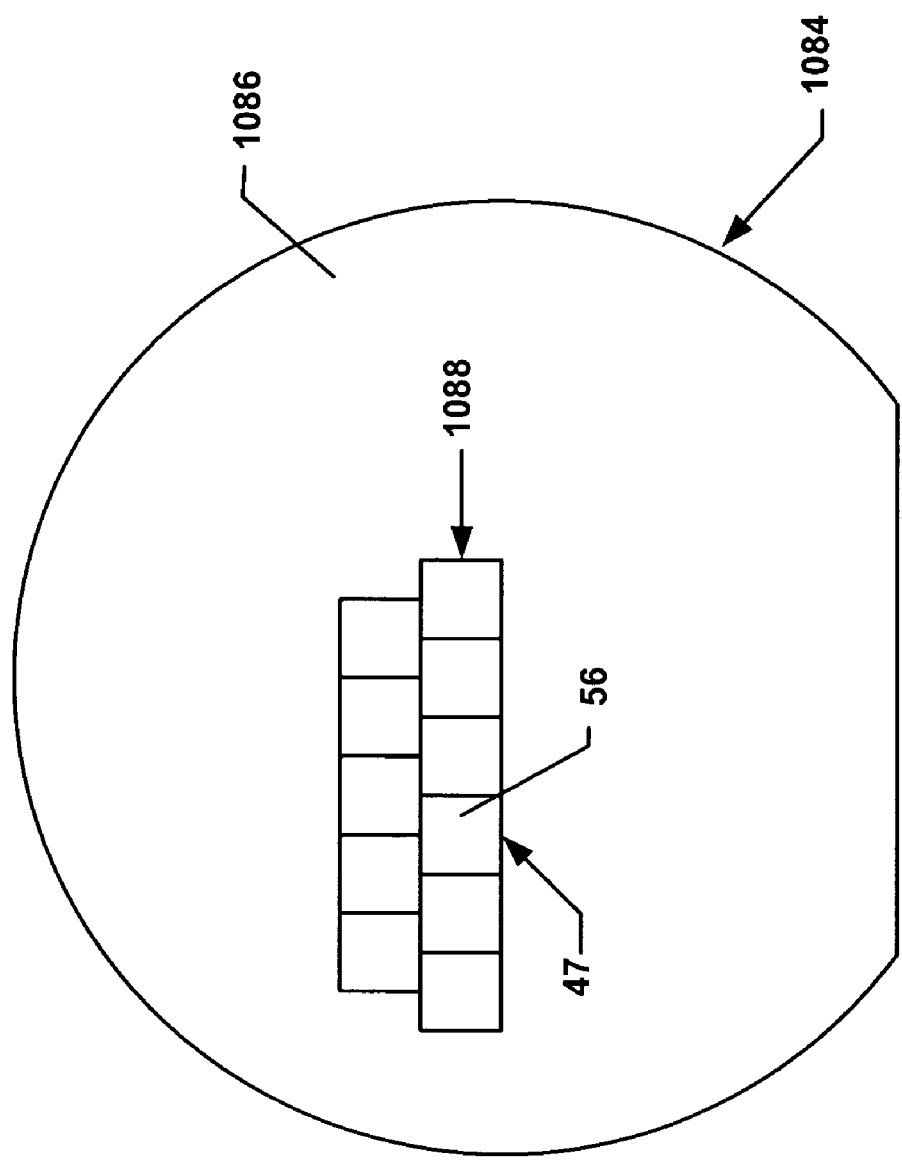
FIG. 11 is a top plan view of a wafer, illustrating the metallization process of the slider at the wafer level, according to the present invention.

Referring now to FIG. 11, the trailing edge surface 55 of the slider 47 corresponds to the front side 1086 of the wafer 1084, which is also the surface upon which the thin film read/write elements 50 are formed. The wafer 1084 is comprised of a plurality of slider bars 1088 adjoining one another lengthwise.

Figure 12:
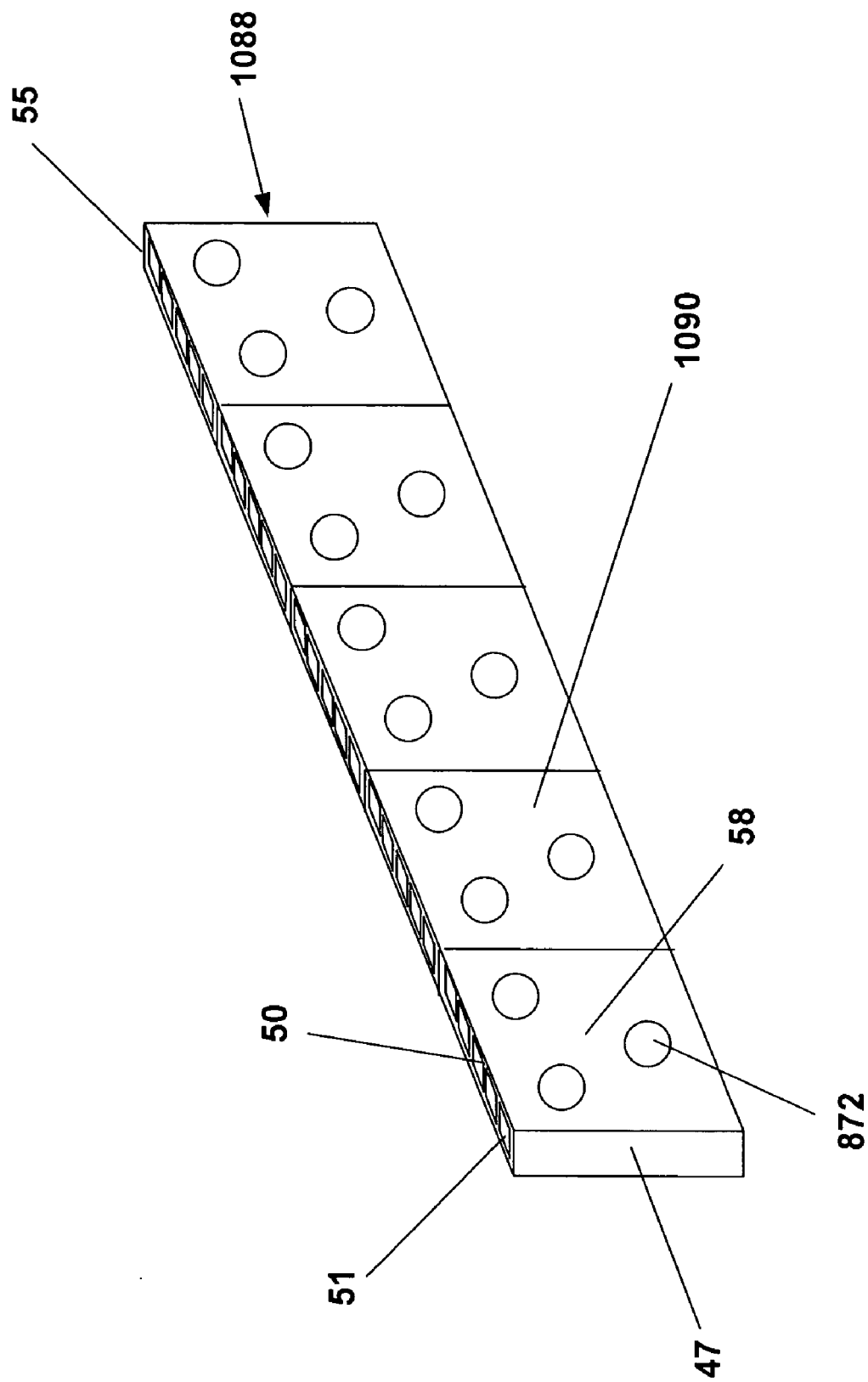
FIG. 12 is a perspective view of a slider bar that has been diced from the wafer of FIG. 11.

With further reference to FIG. 12, each slider bar 1088 is comprised of a plurality of sliders 47 that are positioned adjacent to one another on their sides, in such a manner that their trailing edge surfaces 55 form the front side 1086 of the wafer 1084. A thin film read/write element 50 together with a plurality of electrical contact pads 51 are initially formed at the wafer 1084 level on the front side 1086.

The read/write element 55 is positioned in the center of the trailing edge surface 55 of the slider 47. Two electrical contact pads 51 are placed on either side of the read/write element 55. Upon the formation of the read/write elements 55 and the electrical contact pads 51 on the trailing edge surfaces 55 of the sliders 47 at the wafer 1084 level, the slider bars 1088 are diced from the wafer 1084.

The slider bars 1088 are then subjected to further processing. Initially, the ABS surfaces of the sliders 47 are formed on the front side 1090 of the slider bar 1088. The subsequent operation is the metallization of the back side surfaces 58 of the sliders 47 on the back side of the slider bar 1088.

The metallization step is comprised of three layers of material deposited onto the back side of the slider bar 1088, namely; a metal adhesion layer, a wetting layer, and a corrosion resistance layer. The metal adhesion layer is generally constituted of chromium or titanium, which promotes the adhesion of the solder material. The wetting layer is typically made of copper and is placed between the metal adhesion layer and the corrosion resistance layer.

The corrosion resistance layer is made of gold plated material which is known to be chemically inert. The copper wetting layer protects the gold corrosion resistance layer from fusing into the metal adhesion layer, which would may otherwise result in a brittle failure of the gold corrosion protection layer.

After the metallization step at the slider bar 1088 level is complete, a pattern of solder bumps 872, only three of which are shown for the purpose of clarity, is applied onto the metalized back side of the slider bar 1088. The slider bar 1088 then undergoes a dicing process to form sliders 47.

Figure 13:
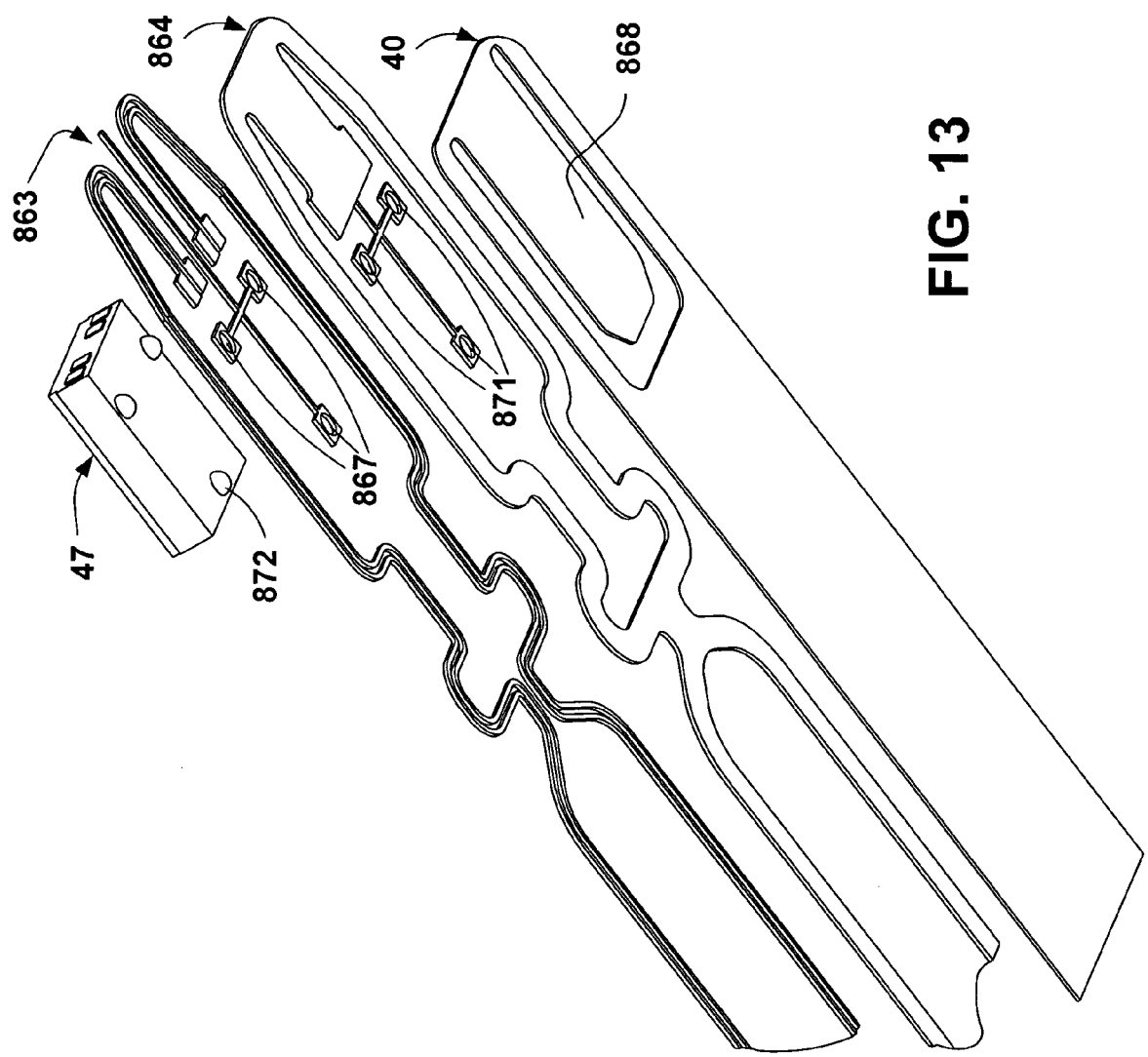
FIG. 13 is an exploded view of a slider/suspension assembly of the present invention.

After the sliders 47 have been sliced from the slider bar 1088, the individual slider 47 further undergoes an assembly process to form the read/write head 35. Referring now to FIG. 13, the slider/suspension assembly 800 is comprised of the slider 47, the metallic bond pad (or copper trace) 862, the polyimide insulator layer 864, and the stainless steel flexure tongue 868.

The slider 47 includes a plurality of solder bumps 872 formed on its back side 58. The metallic bond pad 862 generally is formed by copper traces 863 and includes a feature wherein a plurality of circular holes 867 are formed. The polyimide insulator 864 generally includes a feature wherein a plurality of circular holes 871 are formed. The stainless steel flexure tongue 868 is generally a rectangular tab formed within a clearance 158 of the flexure 40.

The slider/suspension assembly 800 may be formed by the following manufacturing sequence:

1. The metallic bond pad (8620 features and underlying polyimide insulator layer 864 are formed by masking and selectively etching the different layers from laminated sheet material.
2. The bonded assembly of the metallic bond pad 862 and the polyimide insulator 864 is then bonded to the stainless steel flexure tongue 868 to form the flexure 40.
3. The slider 47 is then positioned onto the flexure 40 by aligning the solder bumps 872 with the solder bump receptacles 900 so that the crowns of the solder bumps 872 rest upon the stainless steel flexure tongue 868.
4. A laser or heat energy 877 is directed to the stainless steel flexure tongue 868 to melt the solder bumps 872. The liquefied solder bumps 872 begin to reflow to form a bond line 870 between the back side 58 of the slider 47 and metallic bond pad 862. Upon cooling, the bond line 870 forms a solid mechanical and electrical connection between the slider 47 and the flexure 40, which collectively form the slider/suspension 800.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular application or environment.

What is claimed is:

1. A method of manufacturing a head gimbal assembly for use in a data storage system, comprising:
    fabricating a slider having an air bearing surface and a backside that opposes the air bearing surface;
    depositing a plurality of solder bumps on the backside;
    positioning the slider adjacent to a flexure having at least a thermally conductive flexure tongue coated with an insulation layer, and a pattern of receptacles that extend through the insulation layer to the flexure tongue, such that the solder bumps are substantially aligned with the receptacles;
    directing a laser beam to the flexure tongue to heat the flexure tongue sufficiently to melt the solder bumps.

2. The method of claim 1, further comprising metalizing the backside.

3. The method of claim 1, wherein the flexure tongue includes stainless steel.

4. The method of claim 1, wherein the insulation layer includes polyimide.

5. The method of claim 1 wherein at least one receptacle is substantially cylindrically shaped.

6. The method of claim 5, wherein the at least one receptacle has a radius of approximately 75 microns.

7. The method of claim 5 wherein the at least one receptacle has a depth and a radius that is greater than the depth.

8. The method of claim 1, wherein at least one solder bump is substantially hemispherical in shape.

9. The method of claim 7, wherein at least one solder bump has a radius of approximately 80 microns.

10. The method of claim 1, further comprising extending the receptacles through the flexure tongue.

* * * * *